US012633292B2

(12) United States Patent
Shi et al.

(10) Patent No.: US 12,633,292 B2
(45) Date of Patent: May 19, 2026

(54) ENSEMBLE LEARNING (EL)-BASED SPEAKER VERIFICATION METHOD

(71) Applicant: Hangzhou Dianzi University, Hangzhou City (CN)

(72) Inventors: Xiaoying Shi, Hangzhou City (CN); Ruiqi Shu, Hangzhou City (CN); Kailiang Hao, Hangzhou City (CN); Fengyu Yang, Hangzhou City (CN); Hongyu Chen, Hangzhou City (CN); Zhenyu Jin, Hangzhou City (CN)

(73) Assignee: Hangzhou Dianzi University, Hangzhou (CN)

( * ) Notice: Subject to any disclaimer, the term of this patent is extended or adjusted under 35 U.S.C. 154(b) by 135 days.

(21) Appl. No.: 18/791,797

(22) Filed: Aug. 1, 2024

(65) Prior Publication Data

US 2025/0046315 A1    Feb. 6, 2025

(30) Foreign Application Priority Data

Aug. 2, 2023    (CN) ......................... 202310964825.4

(51) Int. Cl.
| | |
|---|---|
| *G10L 17/12* | (2013.01) |
| *G06N 20/20* | (2019.01) |
| *G10L 17/04* | (2013.01) |
| *G10L 25/06* | (2013.01) |

(52) U.S. Cl.
CPC .............. *G10L 17/12* (2013.01); *G06N 20/20* (2019.01); *G10L 17/04* (2013.01); *G10L 25/06* (2013.01)

(58) Field of Classification Search
CPC ......... G10L 17/12; G10L 17/04; G10L 25/06; G10L 17/02; G10L 17/06; G10L 17/18; G10L 25/27; G10L 25/51; G06N 20/20
USPC ......................................................... 704/246
See application file for complete search history.

(56) References Cited

U.S. PATENT DOCUMENTS

| | | | | |
|---|---|---|---|---|
| 11,929,078 | B2 * | 3/2024 | Tuo .......................... | G10L 17/18 |
| 12,327,564 | B1 * | 6/2025 | Tan .......................... | G10L 17/04 |
| 2008/0195387 | A1 * | 8/2008 | Zigel ....................... | G10L 17/06 |
| | | | | 704/E17.007 |
| 2020/0118544 | A1 * | 4/2020 | Lee ........................ | G10L 15/063 |
| 2021/0343294 | A1 * | 11/2021 | Wintrode ................ | G10L 17/02 |
| 2022/0270611 | A1 * | 8/2022 | Tuo .......................... | G06N 20/20 |
| 2022/0392453 | A1 * | 12/2022 | Gupta ..................... | G10L 17/12 |

(Continued)

*Primary Examiner* — Tung T Vo
(74) *Attorney, Agent, or Firm* — Thomas Horstemeyer, LLP

(57) ABSTRACT

Provided is an ensemble learning (EL)-based speaker verification method. The method includes: data acquisition and preprocessing; selecting and training a group of basic models, and optimizing model parameters; performing similarity scoring on an acquired pair of speaker feature embedding via the group of basic models; constructing a detection cost function (DCF); generating a weight, and performing weighted fusion on scoring results of the group of basic models based on the weight, to obtain a final ensemble model for speaker verification; based on a near-speaking or far-speaking test scenario of a voice sample, the scenario is distinguished and input into the ensemble model, to obtain a final similarity score after weighted fusion; and determining, based on a threshold, whether there is a same speaker, where if the similarity score is greater than the threshold, it is determined that there is a same speaker.

10 Claims, 2 Drawing Sheets

(56) References Cited

U.S. PATENT DOCUMENTS

| 2023/0095526 | A1* | 3/2023 | Chen | ........................ | G10L 25/21 |
| | | | | | 704/243 |
| 2023/0386476 | A1* | 11/2023 | Gurbani | .................. | G10L 17/12 |
| 2024/0185861 | A1* | 6/2024 | Weston | .................. | G10L 17/22 |

* cited by examiner

ENSEMBLE LEARNING (EL)-BASED SPEAKER VERIFICATION METHOD

CROSS REFERENCE TO RELATED APPLICATION

This patent application claims the benefit and priority of Chinese Patent Application No. 202310964825.4, filed with the China National Intellectual Property Administration on Aug. 2, 2023, the disclosure of which is incorporated by reference herein in its entirety as part of the present application.

TECHNICAL FIELD

The present disclosure pertains to the field of voice recognition technologies, and in particular, to an EL-based speaker verification method.

BACKGROUND

Speaker recognition refers to a biometric recognition technology with advantages of low costs, weak privacy, no contact, and the like. Speaker verification is a subtask in the speaker recognition. A voiceprint similarity of a voice is automatically determined by analyzing voice parameters in a voice waveform that reflect physiological and behavioral features of a speaker, to conclude whether a specified voiceprint sample belongs to a specific speaker. This technology is widely used in finance, security and protection, justice, and other fields. For example, in telephone banking and mobile payments, this technology can automatically verify an identity of a customer based on a voiceprint of the customer, ensuring transaction security and accuracy. In access control and surveillance systems, this technology can provide a personalized service by verifying an identity of a speaker, determine whether there are strangers, and strengthen security measures. In the judicial field, by comparing a voiceprint of a suspect with a voiceprint recorded in a crime scene, an identity of the suspect can be quickly confirmed, providing strong evidence for solving the case.

With the development of deep learning, a deep neural network (DNN) is used in an existing study to extract voice features and train a model, to improve accuracy of speaker verification. Currently, a residual neural network (ResNet) and x-vector are two main methods for speaker verification. The ResNet resolves a gradient vanishing problem in a deep network by introducing a residual block, capturing a voiceprint feature to distinguish a difference between different speakers. x-vector is proposed based on a time delay neural network (TDNN) structure. A time pooling layer in a network performs aggregation on input voices, to capture a long-term feature of a speaker. The researchers further proposed emphasized channel attention, propagation and aggregation (ECAPA)-TDNN, which improves recognition accuracy by introducing a squeeze excitation (SE) module and a channel attention mechanism (CAM).

However, in an actual use scenario, cross-channel and near-far speaking problems greatly affect accuracy of speaker verification. If people use different devices to acquire voiceprint registration audio and verification audio, or sampling frequencies of the registration audio and the verification audio are inconsistent, accuracy of a result of speaker verification can be affected. In addition, issues of near speaking and far speaking are involved in a practical scenario, for example, near speaking for a mobile phone assistant and far speaking general for a loudspeaker box, a television, and the like, which also affects the result of speaker verification. Consequently, recognition accuracy of an existing speaker verification technology is not high in cross-channel and near-far speaking scenarios, which limits an application scenario of the speaker verification technology.

SUMMARY

To resolve a disadvantage of the conventional technology, and achieve high recognition accuracy and good robustness in cross-channel and near-far speaking scenarios, to meet a purpose of product implementation in a real scenario, the following technical solutions are used in the present disclosure:

An EL-based speaker verification method includes:

step 1: performing data acquisition and preprocessing;

step 2: selecting and training a group of basic models, and optimizing model parameters; and step 3: constructing an ensemble model, including the following steps:

step 3.1: converting acoustic feature vectors of an input pair of voice samples into a pair of speaker feature embedding via the group of basic models, and scoring the voice samples based on a cosine similarity to separately obtain similarity scores of the group of basic models;

step 3.2: constructing a detection cost function (DCF); and step 3.3: generating a weight; performing weighted fusion on scoring results of the group of basic models based on the weight to obtain a total similarity score list; traversing score values in the total score list one by one as a current temporary threshold, where if a score value is greater than the current temporary threshold, it is determined that there is a same speaker, if the score value is not greater than the temporary threshold, it is determined that there are different speakers, calculating correctness rates of training set data under values of all temporary thresholds, and taking a temporary threshold with a highest correctness rate as a threshold; based on the threshold, determining, based on the total similarity score list, a positive number of scores greater than the threshold and a negative number of scores less than the threshold; calculating a target detection result by using the DCF; generating a new weight, and repeating the foregoing operation to obtain a new target detection result; and based on a difference of the target detection result, iterating a weight until an iteration ends, to obtain a final ensemble model for speaker verification.

Further, the DCF in step 3.2 is as follows:

$$DCF = C_{FR} \times E_{FR} \times P_{target} + C_{FA} \times E_{FA} \times (1 - P_{target}),$$

$C_{FR}$ and $C_{FA}$ respectively represent penalty costs for falsely rejecting a real speaker and falsely accepting an impostor, $P_{target}$ and $1-P_{target}$ respectively represent prior probabilities of appearances of the real speaker and the impostor, and $E_{FR}$ and $E_{FA}$ respectively represent a false rejection (FR) rate and a false acceptance (FA) rate; and $C_{FR}$ and $C_{FA}$ may take a value of 1, $P_{target}$ may take a value of 0.5, and in this case, $DCF = 0.5\lambda E_{FR} + 0.5\lambda E_{FA}$.

In step 3.3, a total number of true positives (TP) and a total number of true negatives (TN) are calculated based on the labels of the test set, and then an error number of false negatives (FN) and an error number of false positives (FP) are calculated; and a dcf value is calculated based on the DCF as the target detection result, $E_{FR}$=FN/(FN+TP), and $E_{FA}$=FP/(FP+TN).

Further, in step 3.3, a temperature T, a minimum temperature t, a cooling factor $\alpha$, and a number of iteration times n of the model are set, if a difference of the target detection result is $\delta<0$, the new weight is accepted, or if the difference of the target detection result is not $\delta<0$, the new weight is accepted with a probability of $\exp(-\delta/T)$ in accordance with a Metropolis criterion; the new weight is generated and the new target detection result is obtained until the number of iteration times n is reached; and a temperature is reduced by multiplying the cooling factor, that is, $T=T\times\alpha$, and the iteration is stopped if the temperature is lower than the minimum temperature t.

Further, in step S1, a voice sample pair is selected based on a recording distance, and a near-speaking registration near-speaking test scenario and a near-speaking registration far-speaking test scenario are separately simulated; and
in step S3, two corresponding groups of weights and thresholds are separately calculated for the near-speaking registration near-speaking test scenario and the near-speaking registration far-speaking test scenario.

Further, the method further includes step 4: testing the ensemble model: which includes: inputting a pair of test voice samples; determining, based on sampling frequencies of the voice samples, whether it is near speaking or far speaking; if it is in the near-speaking registration far-speaking test scenario, performing downsampling processing on a first voice sample, and processing the first voice sample and a second voice sample based on a weighted prediction error (WPE) algorithm; inputting the voice samples into the ensemble model to obtain a final similarity score after weighted fusion; and determining, based on the threshold, whether there is a same speaker, where if the similarity score is greater than the threshold, it is determined that there is a same speaker, or if the similarity score is not greater than the threshold, it is determined that there are different speakers.

Further, a signal is filtered by a low-pass filter based on a downsampling algorithm, to remove a high-frequency component, and a sampling point is extracted from the signal based on a downsampling factor at a specific interval to obtain a downsampled signal, to resolve a problem of a voice channel information difference caused by a cross-channel problem; and based on the WPE algorithm, frame segmentation is performed on an input signal by setting a filter order and a truncation point, and each frame is filtered, so that reverberation can be effectively suppressed and noise can be reduced, thereby achieving a voice signal enhancement effect and reducing impact of an environment difference on the voice sample.

Further, step 2 includes the following steps:
step 2.1: extracting an acoustic feature of an input voice sample, and extracting an acoustic feature of an original voice signal based on a mel frequency cepstral coefficient (MFCC) and/or a spectrogram, to obtain an acoustic feature vector;
step 2.2: constructing basic models; and
step 2.3: training the basic models based on an acoustic feature and optimizing model parameters; separately performing training and parameter optimization on three basic models based on a stochastic gradient descent algorithm, and using additive angular margin (AAM)-Softmax to define a loss function; initializing the model parameters and a learning rate, and iterating each small batch of training data to update a parameter, that is, calculating a gradient of the loss function for each parameter by using a current parameter, and updating the model parameters according to values of the gradient and a current learning rate; when the learning rate attenuates to a set threshold, stopping iteration to complete optimization training of one model; and repeating the foregoing process until all the three basic models are trained and optimized.

Further, the basic models include: a residual neural network (ResNet), a time delay neural network (TDNN), and emphasized channel attention, propagation and aggregation (ECAPA)-TDNN;
for the ResNet basic model, the acoustic feature vector is introduced into a ResNet34 model, a network structure of the model includes an input layer, a group of convolutional layers, and an output layer, each convolutional layer includes a convolution operation, a batch normalization, and an activation function rectified linear unit (ReLU), multiple (every four) convolutional layers are included in one residual block, and each residual block includes two convolutional layers and one skip connection, where the skip connection can ensure that a gradient can be transmitted through the entire network structure in a back propagation process, thereby avoiding a gradient vanishing problem, and a global average pooling layer is applied to an output feature of a last residual block, to obtain speaker feature embedding;
for the TDNN basic model, the acoustic feature vector is introduced into the TDNN model, and a network structure of the model includes an input layer, a group of TDNN layers, an attention statistics pooling (ASP) layer, and two fully connected layers; the TDNN layer includes a one-dimensional convolutional layer, an activation function ReLU, and a one-dimensional batch normalization layer, so that the model can extract features from different time ranges, and capture a local pattern and a change trend in time series data (TSD); the ASP layer includes a one-dimensional convolutional layer, an activation function ReLU, a one-dimensional batch normalization layer, and a Softmax operation, and an attention mechanism is used to capture a global feature of an input sequence; and acoustic features are extracted by using features of the TDNN layer, converged by using features of an ASP module, and linearly transformed by using each of the fully connected layers, to obtain final speaker feature embedding; and
for the ECAPA-TDNN basic model, the acoustic feature vector is introduced into the ECAPA-TDNN model, and a network structure of the model includes a one-dimensional convolutional layer, an activation function ReLU, a one-dimensional batch normalization layer, multiple (three) squeeze-excitation (SE)-Res2Block layers, one attention layer for statistical pooling, and one FC layer; each of the SE-Res2Block layers includes multiple one-dimensional convolutional layers and a batch normalization layer, and a residual connection is performed between one layer and another layer; the attention layer includes a series of one-dimensional convolutions, an activation function ReLU, a batch normalization layer, and a Softmax operation, to calculate an attention weight; first, an introduced acoustic feature is processed by using the one-dimensional convolutional layer, the activation function ReLU, and the batch normalization layer, to capture a local feature; then, a degree of concern of the model on important features is enhanced by using a three-layer SE-Res2Block module, the SE-Res2Block module is connected to an attention module by using the one-dimensional convolutional layer, and statistical pooling is performed on an output by using the attention module, to obtain the attention weight; and finally the attention weight is multiplied by an original feature vector to obtain a weighted feature vector, and the weighted feature vector is input into the fully connected layer and the batch normalization layer to obtain final output speaker feature embedding.

Further, in step 1, a speaker recognition voice dataset is constructed through data acquisition, voices from T different speakers are acquired, and voices of each speaker include k voice samples under different recording conditions, which are used as one group, to obtain T groups of data, where each speaker has a unique identity (ID); the different recording conditions include different speaking scenarios, different intonations and speaking speeds, different recording distances, and different recording devices used; voice samples at different distances are recorded, to simulate a near-far speaking scenario in speaker verification; voice data is acquired by using different recording devices, to simulate possible changes in a spectrum characteristic and a noise characteristic of an audio signal in a cross-channel scenario; a pair of voice samples are randomly selected from the T groups of data to construct a training set, and each record is <voice sample 1, recording distance 1, voice sample 2, recording distance 2, and label>; it is determined, according to speaker IDs, whether two voice samples come from a same speaker, for classification labeling, and if the two voice samples belong to the same speaker, the label is set to 1, or if the two voice samples do not belong to the same speaker, the label is set to 0; and a pair of voice samples are selected from the T groups of data to construct a test set, and the test set includes a voice of a speaker that does not belong to the training set.

Further, in step 1, a same duration t is set for voices in the training set by preprocessing and training voice data, to be specific, for audio with a duration greater than t, a segment of audio with the duration t is randomly selected, and for audio with a duration less than t, the duration is increased to t through padding, and data enhancement is performed via a random enhancement mode.

The present disclosure has the following beneficial effects.

According to the new EL-based speaker verification method in the present disclosure, first, the three basic models of the ResNet basic model, the TDNN basic model, and the ECAPA-TDNN basic model are constructed, and the training parameters are optimized. Then, for the near-speaking registration near-speaking test scenario and the near-speaking registration far-speaking test scenario, a simulated annealing (SA) algorithm is separately used to calculate a fusion weight, and weighted fusion is performed on the three basic models to obtain the ensemble model. In addition, processing by using the WPE algorithm and downsampling processing are performed on test data in the near-speaking registration far-speaking test scenario, so that impact of a channel difference and ambient noise on a voice signal can be reduced. The present disclosure can effectively improve cross-channel and near-far speaking problems, improve recognition accuracy, and is applicable to speaker verification scenarios in various fields.

DETAILED DESCRIPTION OF THE EMBODIMENTS

The specific implementations of the present disclosure are described in detail below with reference to the accompanying drawings. It should be understood that the specific implementations described herein are merely intended to illustrate and interpret the present disclosure, rather than to limit the present disclosure.

Figure 1:
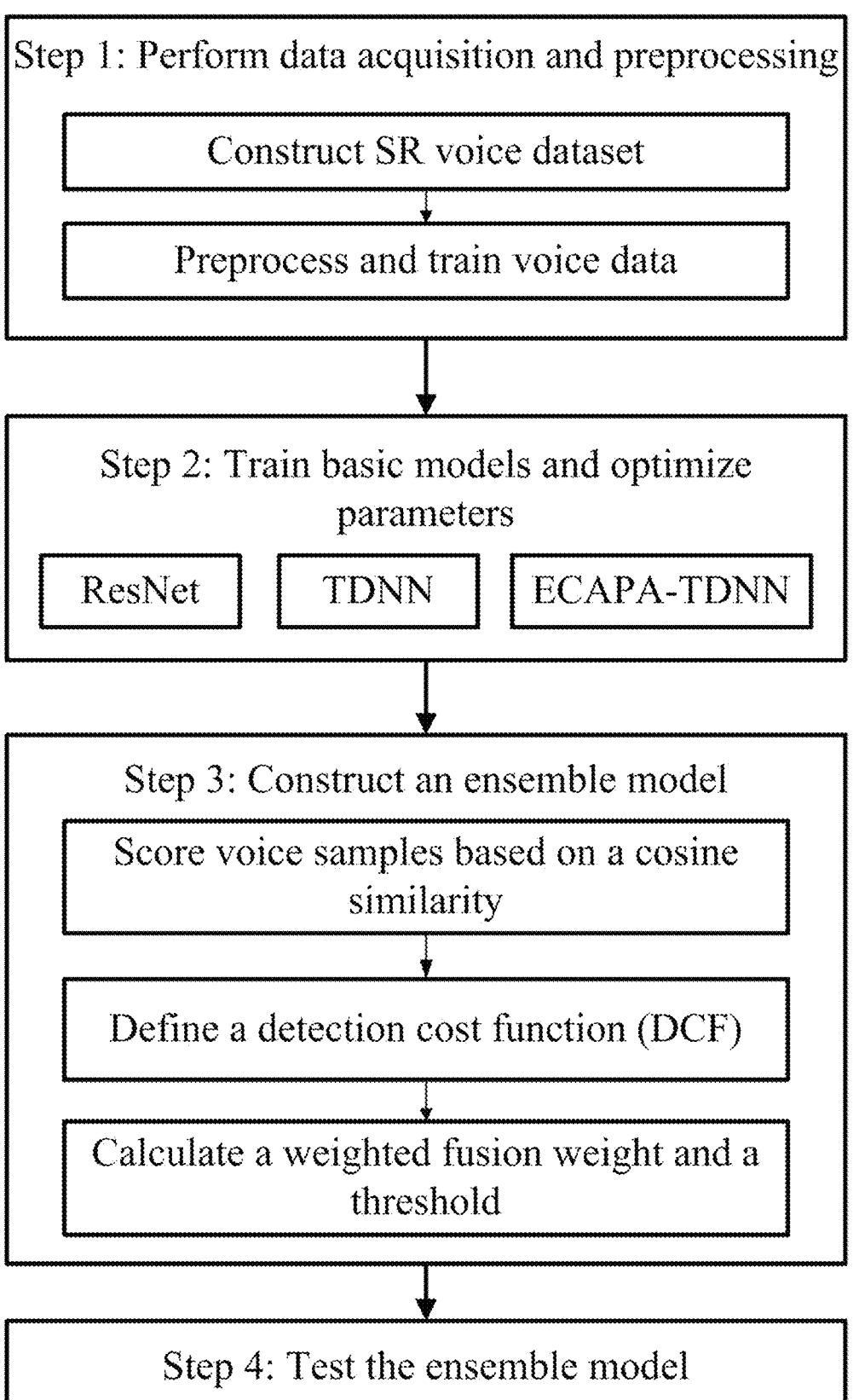
FIG. 1 is a flowchart of an EL-based speaker verification method according to an embodiment of the present disclosure.
Figure 2:
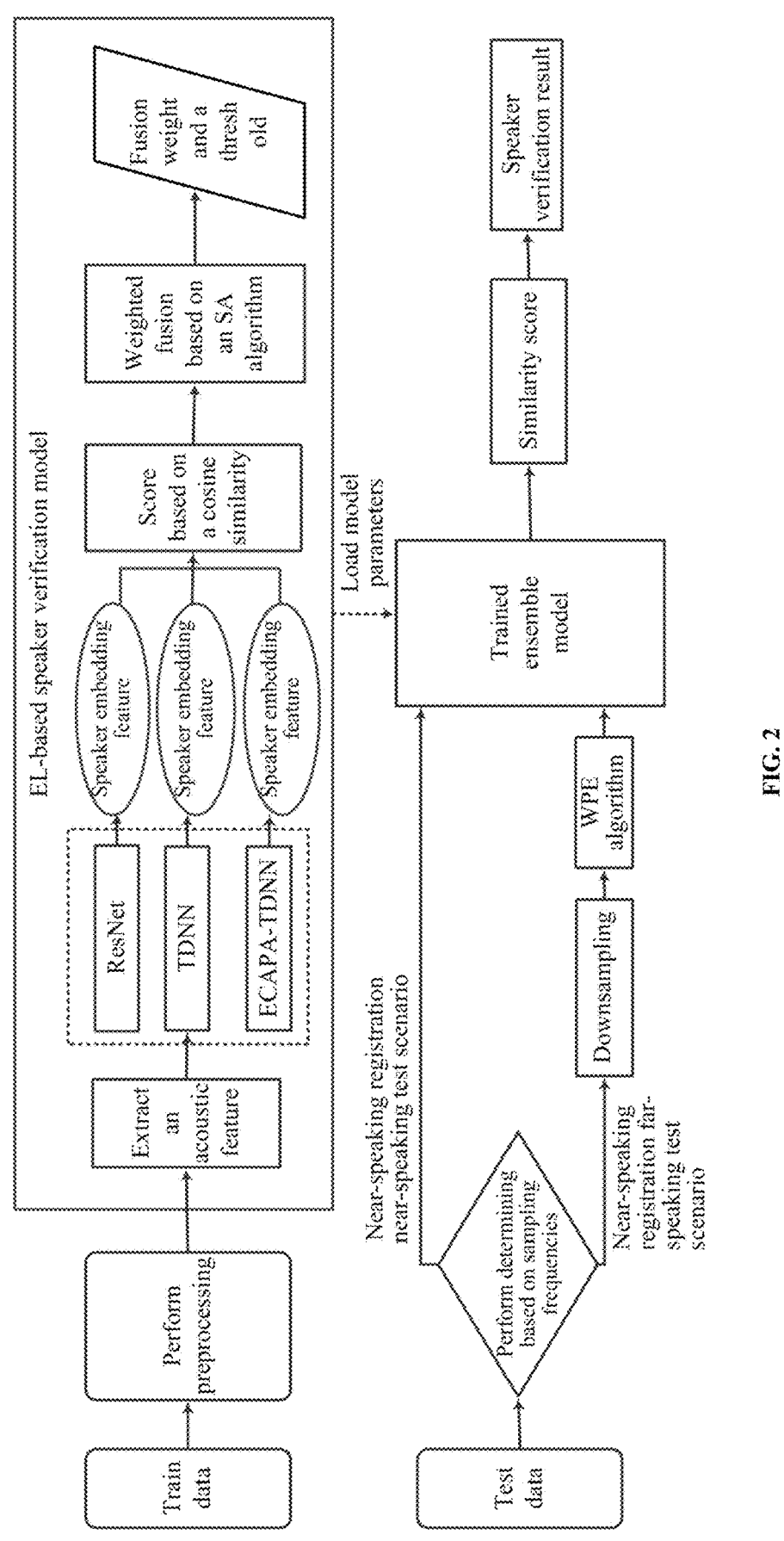
FIG. 2 is a schematic diagram of training and test processes of an EL-based speaker verification model according to an embodiment of the present disclosure.

As shown in FIG. 1 and FIG. 2, an EL-based speaker verification method includes the following steps.

Step 1: Perform data acquisition and preprocessing, specifically including the following steps.

Step 1.1: Construct a speaker recognition voice dataset.

Voices from T different speakers are acquired, and voices of each speaker include k voice samples recorded in different speaking scenarios, with different intonations and speaking speeds, at different recording distances, and using different recording devices. Voice samples at different distances are recorded, to simulate a near-far speaking scenario in speaker verification. Voice data is acquired by using different recording devices, to simulate possible changes in a spectrum characteristic and a noise characteristic of an audio signal in a cross-channel scenario. k voices of each speaker serve as one group of data, and a total of T groups of data are obtained. Each speaker has a unique ID.

A pair of voice samples are randomly selected from the first 80% of the T groups of data to construct a training set. Each record is <voice sample 1, recording distance 1, voice sample 2, recording distance 2, and label>. It is determined, according to speaker IDs, whether two voice samples come from a same speaker. If two voice samples belong to the same speaker, the label is set to 1, or if two voice samples do not belong to the same speaker, the label is set to 0. A pair of voice samples are selected from the T groups of data to construct a test set, so that the test set includes a voice of a speaker that does not belong to the training set. To test model performance in a near-far speaking scenario, a voice sample pair whose recording distance 1 and recording distance 2 are both less than or equal to 1 m is selected to simulate a near-speaking registration near-speaking test scenario. A voice sample pair whose recording distance 1 is less than or equal to 1 m but recording distance 2 is greater than or equal to 5 m is selected to simulate a near-speaking registration far-speaking test scenario.

Step 1.2: Preprocess and train the voice data.

A same duration t is set for voices in the training set. To be specific, for audio with a duration greater than t, a segment of audio with the duration t is randomly selected, and for audio with a duration less than t, the duration is increased to t through padding, and data enhancement is performed via a random enhancement mode.

Step 2: Select a ResNet basic model, a TDNN basic model, and an ECAPA-TDNN basic model as basic models, train the models, and optimize parameters.

Step 2.1: Extract an acoustic feature of an input voice sample.

An acoustic feature of an original voice signal is extracted by using an MFCC and/or a spectrogram, to obtain an acoustic feature vector.

Step 2.2: Construct ResNet-based, TDNN-based, and ECAPA-TDNN-based basic models.

Step 2.2.1: Train the ResNet-based basic model.

The acoustic feature vector is introduced into a ResNet34 model. A network structure of the model includes 34 layers. One convolutional layer is used as an input layer, and one FC layer is used as an output layer. There are 32 convolutional layers in the middle, and each convolutional layer includes a convolution operation, batch normalization, and an activation function ReLU.

Every four convolutional layers form one residual block. Each residual block includes two convolutional layers and one skip connection. The skip connection can ensure that a gradient can be transmitted through the entire network structure in a back propagation process, thereby avoiding a gradient vanishing problem. A GAP layer is applied to an output feature of a last residual block, to obtain speaker feature embedding.

Step 2.2.2: Train the TDNN basic model.

The acoustic feature vector is introduced into the TDNN model. A network structure of the model includes an input layer, five TDNN layers, one ASP layer, and two FC layers. The TDNN layer includes a one-dimensional convolutional layer, an activation function ReLU, and a one-dimensional batch normalization layer, so that the model can extract features from different time ranges, and capture a local pattern and a change trend in TSD. The ASP layer includes a one-dimensional convolutional layer, an activation function ReLU, a one-dimensional batch normalization layer, and a Softmax operation. An attention mechanism is used to capture a global feature of an input sequence. Acoustic features are extracted by using features of the TDNN layer, converged by using features of an ASP module, and linearly transformed by using the FC layer, to obtain final speaker feature embedding.

Step 2.2.3: Train the ECAPA-TDNN basic model.

The acoustic feature vector is introduced into the ECAPA-TDNN model. A network structure of the model includes a one-dimensional convolutional layer, an activation function ReLU, a one-dimensional batch normalization layer, three SE-Res2Block layers, one attention layer for statistical pooling, and one FC layer in total. The SE-Res2Block layer includes multiple one-dimensional convolutional layers and a batch normalization layer, and a residual connection is performed between one layer and another layer. The attention layer calculates an attention weight by using a series of one-dimensional convolutions, the activation function ReLU, the batch normalization layer, and a Softmax operation. First, an introduced acoustic feature is processed by using the one-dimensional convolutional layer, the activation function ReLU, and the batch normalization layer, to capture a local feature. Then, a degree of concern of the model on important features is enhanced by using a three-layer SE-Res2Block module. The SE-Res2Block module is connected to an attention module by using the one-dimensional convolutional layer. Statistical pooling is performed on an output by using the attention module, to obtain the attention weight. Finally, the attention weight is multiplied by an original feature vector to obtain a weighted feature vector, and the weighted feature vector is input into the FC layer and the batch normalization layer to obtain final output speaker feature embedding.

Step 2.3: Train the basic models and optimize parameters.

Training and parameter optimization are separately performed on the three basic models based on a stochastic gradient descent algorithm. A loss function is defined by using AAM-Softmax. The model parameters and a learning rate are initialized, and each small batch of training data is iterated to update a parameter, that is, a gradient of the loss function for each parameter is calculated by using a current parameter, and the model parameters are updated according to values of the gradient and a current learning rate; when the learning rate attenuates to a set threshold, iteration stops to complete optimization training of one model; and the foregoing process is repeated until all the three basic models are trained and optimized.

Step 3: Construct an ensemble model.

Step 3.1: Score voice samples based on a cosine similarity.

Acoustic feature vectors of an input pair of voice samples are converted into a pair of speaker feature embedding by using the three basic models, and the voice samples are scored based on the cosine similarity to separately obtain similarity scores of the three basic models. It is assumed that training set data includes K pairs of voice data. For a kth group of data, a corresponding similarity score $$\left\{ sc_k^R, sc_k^T, sc_k^E \right\}$$

is obtained based on the three basic models.

$$sc_k^R, sc_k^T, sc_k^E$$

respectively represent score values obtained by using the ResNet model, the TDNN model, and the ECAPA-TDNN model for the kth group of data.

Step 3.2: Define a DCF.

The DCF is defined as follows:

$DCF = C_{FR} \times E_{FR} \times P_{target} + C_{FA} \times E_{FA} \times (1 - P_{target})$, where $C_{FR}$ and $C_{FA}$ respectively represent penalty costs for falsely rejecting a real speaker and falsely accepting an impostor, $P_{target}$ and $1 - P_{target}$ respectively represent prior probabilities of appearances of the real speaker and the impostor, and $E_{FR}$ and $E_{FA}$ represent an FR rate and an FA rate; and $C_{FR}$ and $C_{FA}$ take a value of 1, $P_{target}$ takes a value of 0.5, and in this case, $DCF = 0.5 \times E_{FR} + 0.5 \times E_{FA}$.

Step 3.3: Calculate a weighted fusion weight and a threshold.

Based on a similarity score list of the three basic models, a weighted fusion weight and a threshold of scoring results of the three basic models are calculated by using an SA algorithm. Specific steps are as follows:

Step 3.3.1: Set an initial temperature T=10, a minimum temperature t=0.01, a cooling factor α=0.99, and a number of iteration times n=100, and randomly generate an initial weight $W = \{w_1, w_2, w_3\}$.

Step 3.3.2: Perform weighted fusion on the scoring results of the three basic models by using a current weight, to obtain a total similarity score list $S = \{s_k\}$, where $0 \leq k < K$, and $$s_k = w_1^* sc_k^R + w_2 * sc_k^T + w_3 * sc_k^E,$$

and traverse score values in the total score list S one by one as a current temporary threshold, where for each $s_k$, if $s_k$ is greater than the current temporary threshold, it is determined that there is a same speaker, if $s_k$ is not greater than the temporary thresholds, it is determined that there are different speakers; and calculate correctness rates of training set data under values of all temporary thresholds, and use a temporary threshold with a highest correctness rate as a threshold, denoted as threshold.

Step 3.3.3: Based on the threshold, determine, according to the total similarity score list S, a positive number (scores are greater than the threshold) and a negative number (scores are less than the threshold), calculate a total true positive number and a total true negative number based on a test set label, denoted as TP and TN, and calculate a false negative error number and false positive error number, denoted as FN and FP.

Step 3.3.4: Calculate a dcf value based on a formula $DCF=0.5 \times E_{FR}+0.5 \times E_{FA}$, where $E_{FR}=FN/(FN+TP)$ and $E_{FA}=FP/(FP+TN)$.

Step 3.3.5: Randomly generate a new weight $W'=\{w'_1, w'_2, w'_3\}$, and repeat steps 3.3.2 to 3.3.4 by using the new weight, to obtain a dcf.

Step 3.3.6: Calculate a difference between two dcf values, denoted as $\delta=dcf-dcf$; if $\delta<0$, and accept the new weight $W'$, or if it is not $\delta<0$, accept the new weight $W'$ with a probability of $exp(-\delta/T)$ according to a Metropolis criterion, where T represents a current temperature.

Step 3.3.7: Repeat step 3.3.5 to step 3.3.6 until the number of iteration times n is reached.

Step 3.3.8: Reduce a temperature by multiplying the cooling factor $\alpha$, that is, $T=T \times \alpha$; and if the temperature is lower than the minimum temperature, stop the iteration, or if the temperature is not lower than the minimum temperature, return to step 3.3.2.

Two groups of weights and thresholds are separately calculated for the two scenarios of near-speaking registration near-speaking test and near-speaking registration far-speaking test.

Step 4: Test the ensemble model, including the following steps.

Input a pair of test voice samples, and determine, based on sampling frequencies of the voice samples, whether it is near speaking or far speaking; if it is in the near-speaking registration far-speaking test scenario, perform downsampling processing on a voice sample 1, and process the voice sample 1 and a voice sample 2 by using a WPE algorithm, where a signal is filtered by a low-pass filter based on a downsampling algorithm to filter to remove a high-frequency component, and a sampling point is extracted from the signal according to a downsampling factor at a specific interval to obtain a downsampled signal, to resolve a problem of a voice channel information difference caused by a cross-channel problem; and based on the WPE algorithm, frame segmentation is performed on an input signal by setting a filter order and a truncation point, and each frame is filtered, so that reverberation can be effectively suppressed and noise can be reduced, thereby achieving a voice signal enhancement effect and reducing impact of an environment difference on the voice sample; and Input processed voice samples into the ensemble model to obtain a final similarity score after weighted fusion; and determine, according to the threshold, whether there is a same speaker, where if the similarity score is greater than the threshold, it is determined that there is a same speaker, if the similarity score is not greater than the threshold, it is determined that there are different speakers.

The above embodiments are merely intended to describe the technical solutions of the present disclosure, rather than to limit the present disclosure. Although the present disclosure is described in detail with reference to the above embodiments, a person of ordinary skill in the art will understand that modifications can be made to the technical solutions described in the above embodiments or equivalent replacements can be made to some or all technical features thereof. However, these modifications or replacements do not cause the essence of the corresponding technical solutions to depart from the scope of the technical solutions of the embodiments of the present disclosure.

What is claimed is:

1. An ensemble learning (EL)-based speaker verification method, comprising the following steps:

step 1: performing data acquisition and preprocessing;

step 2: selecting and training a group of basic models, and optimizing model parameters; and step 3: constructing an ensemble model, comprising the following steps:

step 3.1: converting acoustic feature vectors of an input pair of voice samples into a pair of speaker feature embedding via the group of basic models, and scoring the voice samples based on a similarity to separately obtain similarity scores of the group of basic models;

step 3.2: constructing a detection cost function (DCF); and step 3.3: generating a weight; performing weighted fusion on scoring results of the group of basic models based on the weight to obtain a total similarity score list; traversing score values in the total score list one by one as a current temporary threshold, wherein if a score value is greater than the current temporary threshold, it is determined that there is a same speaker, if the score value is not greater than the temporary thresholds, it is determined that there are different speakers, calculating correctness rates of training set data under values of all temporary thresholds, and taking a temporary threshold with a highest correctness rate as a threshold; based on the threshold, determining, based on the total similarity score list, a positive number of scores greater than the threshold and a negative number of scores less than the threshold; calculating a target detection result by using the DCF; generating a new weight, and repeating the foregoing operation to obtain a new target detection result; and based on a difference of the target detection result, iterating a weight until an iteration ends, to obtain a final ensemble model for speaker verification.

2. The EL-based speaker verification method according to claim 1, wherein the DCF in step 3.2 is as follows:

$$DCF = C_{FR} \times E_{FR} \times P_{target} + C_{FA} \times E_{FA} \times (1 - P_{target}),$$

wherein $C_{FR}$ and $C_{FA}$ respectively represent penalty costs for falsely rejecting a real speaker and falsely accepting an impostor, $P_{target}$ and $1-P_{target}$ respectively represent prior probabilities of appearances of the real speaker and the impostor, and $E_{FR}$ and $E_{FA}$ respectively represent a false rejection rate and a false acceptance rate; and in step 3.3, a total number of true positives (TP) and a total number of true negatives (TN) are calculated based on a test set label, and then an error number of false negatives (FN) and an error number of false positives (FP) are calculated; and a dcf value is calculated based on the DCF as the target detection result, $E_{FR}=FN/(FN+TP)$, and $E_{FA}=FP/(FP+TN)$.

3. The EL-based speaker verification method according to claim 1, wherein in step 3.3, a temperature T, a minimum temperature t, a cooling factor $\alpha$, and a number of iteration times n of each of the models are set, and if a difference of the target detection result is $\delta<0$, the new weight is accepted, if the difference of the target detection result is not $\delta<0$, the new weight is accepted with a probability of $\exp(-\delta/T)$ in accordance with a Metropolis criterion; the new weight is generated and the new target detection result is obtained until the number of iteration times n is reached; and a temperature is reduced by multiplying the cooling factor, that is, $T=T\times\alpha$, and the iteration is stopped if the temperature is lower than the minimum temperature t.

4. The EL-based speaker verification method according to claim 1, wherein in step S1, a voice sample pair is selected based on a recording distance, and a near-speaking registration near-speaking test scenario and a near-speaking registration far-speaking test scenario are separately simulated; and in step S3, two corresponding groups of weights and thresholds are separately calculated for the near-speaking registration near-speaking test scenario and the near-speaking registration far-speaking test scenario.

5. The EL-based speaker verification method according to claim 1, further comprising step 4: testing the ensemble model, which comprises: inputting a pair of test voice samples; determining, based on sampling frequencies of the voice samples, whether it is near speaking or far speaking; if it is in the near-speaking registration far-speaking test scenario, performing downsampling processing on a first voice sample, and processing the first voice sample and a second voice sample based on a weighted prediction error (WPE) algorithm; inputting the voice samples into the ensemble model to obtain a final similarity score after weighted fusion; and determining, based on the threshold, whether there is a same speaker, wherein if the similarity score is greater than the threshold, it is determined that there is a same speaker, or if the similarity score is not greater than the threshold, it is determined that there are different speakers.

6. The EL-based speaker verification method according to claim 5, wherein a signal is filtered by a low-pass filter based on a downsampling algorithm, to remove a high-frequency component, and a sampling point is extracted from the signal based on a downsampling factor at a specific interval to obtain a downsampled signal; and based on the WPE algorithm, frame segmentation is performed on an input signal by setting a filter order and truncation point, and each frame is filtered.

7. The EL-based speaker verification method according to claim 1, wherein step 2 comprises:

step 2.1: extracting an acoustic feature of an input voice sample, and extracting an acoustic feature of an original voice signal based on a mel frequency cepstral coefficient (MFCC) and/or a spectrogram, to obtain an acoustic feature vector;

step 2.2: constructing basic models; and step 2.3: training the basic models based on an acoustic feature and optimizing model parameters; separately performing training and parameter optimization on basic models based on a stochastic gradient descent algorithm; initializing the model parameters and a learning rate, and iterating each small batch of training data to update a parameter, that is, calculating a gradient of a loss function for each parameter by using a current parameter, and updating the model parameters based on values of the gradient and a current learning rate; when the learning rate attenuates to a set threshold, stopping iteration to complete optimization training of one model; and repeating the foregoing process until all three basic models are trained and optimized.

8. The EL-based speaker verification method according to claim 7, wherein the basic models comprise: a residual neural network (ResNet) basic model, a time delay neural network (TDNN) basic model, and an emphasized channel attention, propagation and aggregation (ECAPA)-TDNN basic model;

for the ResNet basic model, the acoustic feature vector is introduced into the ResNet model, a network structure of the model comprises an input layer, a group of convolutional layers, and an output layer, each convolutional layer comprises a convolution operation, a batch normalization, and an activation function, multiple convolutional layers are comprised in one residual block, each residual block comprises two convolutional layers and one skip connection, and a global average pooling layer is applied to an output feature of a last residual block, to obtain speaker feature embedding;

for the TDNN basic model, the acoustic feature vector is introduced into the TDNN model, and a network structure of the model comprises an input layer, a group of TDNN layers, an attention statistics pooling layer, and fully connected layers; the TDNN layer comprises a one-dimensional convolutional layer, an activation function, and a one-dimensional batch normalization layer, and the attention statistics pooling layer comprises a one-dimensional convolutional layer, an activation function, a one-dimensional batch normalization layer, and a Softmax operation; and the fully connected layers are used to obtain final speaker feature embedding; and for the ECAPA-TDNN basic model, the acoustic feature vector is introduced into the ECAPA-TDNN model, and a network structure of the model comprises a one-dimensional convolutional layer, an activation function, a one-dimensional batch normalization layer, multiple squeeze-excitation (SE)-Res2Block layers, an attention layer for statistical pooling, and one FC layer; each of the SE-Res2Block layers comprises multiple one-dimensional convolutional layers and a batch normalization layer, and a residual connection is performed between one layer and another layer; the attention layer comprises a series of one-dimensional convolutions, an activation function rectified linear unit (ReLU), a batch normalization layer, and a Softmax operation, to calculate an attention weight; first, an introduced acoustic feature is processed by using the one-dimensional convolutional layer, the activation function ReLU, and the batch normalization layer, to capture a local feature; then, a degree of concern of the model on important features is enhanced by using an SE-Res2Block module, and statistical pooling is performed on an output by using an attention module, to obtain the attention weight; and finally the attention weight is multiplied by an original feature vector to obtain a weighted feature vector, and the weighted feature vector is input into the fully connected layer and the batch normalization layer to obtain final output speaker feature embedding.

9. The EL-based speaker verification method according to claim 1, wherein in step 1, a speaker recognition voice dataset is constructed through data acquisition, voices from T different speakers are acquired, and voices of each speaker comprise k voice samples under different recording conditions, which are used as one group, to obtain T groups of data; the different recording conditions comprise different speaking scenarios, different intonations and speaking speeds, different recording distances, and different recording devices used; a pair of voice samples are randomly selected from the T groups of data to construct a training set; classification labeling is performed based on whether two voice samples come from a same speaker; and a pair of voice samples are selected from the T groups of data to construct a test set, and the test set comprises a voice of a speaker that does not belong to the training set.

10. The EL-based speaker verification method according to claim 1, wherein in step 1, a same duration t is set for voices in the training set by preprocessing and training voice data, to be specific, for audio with a duration greater than t, a segment of audio with the duration t is randomly selected, and for audio with a duration less than t, the duration is increased to t through padding, and data enhancement is performed via a random enhancement mode.

* * * * *